(12) United States Patent
Mosig

(10) Patent No.: US 7,675,943 B2
(45) Date of Patent: Mar. 9, 2010

(54) SYNCHRONOUS PLAY-OUT OF MEDIA DATA PACKETS

(75) Inventor: Rüdiger Mosig, Stuttgart (DE)

(73) Assignee: Sony Deutschland GmbH, Cologne (DE)

(*) Notice: Subject to any disclaimer, the term of this patent is extended or adjusted under 35 U.S.C. 154(b) by 1355 days.

(21) Appl. No.: 10/656,764

(22) Filed: Sep. 4, 2003

(65) Prior Publication Data

US 2004/0228367 A1 Nov. 18, 2004

(30) Foreign Application Priority Data

Sep. 6, 2002 (EP) ................................. 02020070

(51) Int. Cl.
*H04J 3/06* (2006.01)
*H04L 12/28* (2006.01)
(52) U.S. Cl. ...................................... 370/503; 370/389
(58) Field of Classification Search ................. 370/503, 370/394, 428, 429, 352
See application file for complete search history.

(56) References Cited

U.S. PATENT DOCUMENTS

| | | | | |
|---|---|---|---|---|
| 6,055,246 A * | 4/2000 | Jones | .......................... | 370/503 |
| 6,195,701 B1 * | 2/2001 | Kaiserswerth et al. | ...... | 709/231 |
| 6,360,271 B1 * | 3/2002 | Schuster et al. | ............. | 709/231 |
| 6,741,708 B1 | 5/2004 | Nakatsugawa | | |
| 6,801,505 B1 * | 10/2004 | Cognet | ........................ | 370/252 |
| 6,947,417 B2 * | 9/2005 | Laursen et al. | .............. | 370/389 |
| 7,031,306 B2 * | 4/2006 | Amaral et al. | ............... | 370/389 |
| 7,464,172 B2 * | 12/2008 | Deshpande | ................. | 709/232 |
| 2002/0024970 A1 * | 2/2002 | Amaral et al. | ............... | 370/468 |
| 2002/0107940 A1 * | 8/2002 | Brassil | ........................ | 709/219 |
| 2003/0002477 A1 * | 1/2003 | Israel et al. | .................. | 370/352 |
| 2003/0043782 A1 * | 3/2003 | Laursen et al. | .............. | 370/352 |
| 2003/0061371 A1 * | 3/2003 | Deshpande | ................. | 709/232 |
| 2004/0066751 A1 * | 4/2004 | Tseng et al. | ................. | 370/252 |

FOREIGN PATENT DOCUMENTS

| | | |
|---|---|---|
| EP | 1 098 548 A2 | 5/2001 |
| EP | 1 122 931 | 8/2001 |
| JP | 2001-127712 | 5/2001 |

OTHER PUBLICATIONS

Civanlar, Cash, Haskell: "RFC 2343: RTP Payload Format for Bundled MPEG" Request for Comments, May 1998, XP002229835.
Schulzrinne, Casner, Frederick, Jacobsen: "RFC 1889: RTP: A Transport Protocol for Real-Time Applications" Request For Comments, Jan. 1996, XP002229836.
Montgomery, Warren A.: "Techniques for Packet Voice Synchronization" IEEE Journal on Selected Areas of Communication, vol. 1, No. 6, Dec. 6, 1983, pp. 1022-1028, XP002229837.

* cited by examiner

*Primary Examiner*—Hong Cho
*Assistant Examiner*—Hicham B Foud
(74) *Attorney, Agent, or Firm*—Oblon, Spivak, McClelland, Maier & Neustadt, L.L.P.

(57) ABSTRACT

A media source, including a sending unit that sends out time-stamped media data packets to one or more receiving media sinks. A timestamp of one of the time-stamped media data packets indicates a time of creation of the one of the time-stamped media data packets. The media source also includes a determining unit that determines a play-out time offset. The media source additionally includes a transmission unit that sends out the play-out time offset to the one or more receiving media sinks once for all time-stamped media data packets of a session.

23 Claims, 5 Drawing Sheets

SYNCHRONOUS PLAY-OUT OF MEDIA DATA PACKETS

CROSS-REFERENCE TO RELATED APPLICATION

This application is based upon and claims the benefit of priority from European Patent App. 02 020 070.5 filed Sep. 6, 2002; the contents of which are incorporated herein by reference.

BACKGROUND OF THE INVENTION

1. Field of the Invention

The invention relates to a method, a media source, a media sink and a media processing system to enable a synchronous play-out of media data packets.

2. Description of the Related Art

A human being uses two parameters of sound to determine the position of the sound source: the amplitude and the phase of the sound. Since the intensity of the sound decreases as it travels through air, the ear further away from the sound source receives a lower sound level than the ear close to the sound source. Further, because sound needs time to travel through air, the ear further away receives the signal later than the closer ear. Experiments have shown that human beings perceive a phase difference between the two channels of larger than 6-20 micro seconds (µs) as a displacement of the sound source and two signals with a phase difference of more than 35-40 milliseconds (ms) are perceived as two distinct sounds.

For audio systems that play-out (emit) audio sound this means that an audio signal belonging to one channel of a multi-channel signal, e.g. a stereo signal, should be played at exactly the same time, i.e. exactly the same moment in time, as all other corresponding audio signals belonging to the same multi-channel signal, e.g. the same stereo signal. In other words, a tight synchronization of different audio output devices, e.g. loudspeakers, is necessary so that the time relation between different channels of a multi-channel signal is met during the output. Similar requirements may also occur in other audio applications like e.g. Dolby Surround Systems or in audio-video applications.

The mentioned tight synchronization must also be fulfilled by digital transmission audio systems, where audio signals are transmitted from the media source to the audio output devices (in the following also more generally referred to as media sinks which include also devices to process a received multi-channel signal in any other way) in form of media data packets (in the following also referred to as media packets). Each audio output device must play-out the sound of a media data packet (play-out the media data packet) at exactly the right time, i.e. at the moment another media output device plays out a corresponding media data packet, e.g. belonging to the same stereo signal, but to another channel. If the media data packets are not played-out well synchronized, i.e. corresponding media data packets of different channels belonging to the same stereo signal are played-out at different times in different media output devices, the above mentioned problems occur, i.e. the stereo sound is eventually perceived as coming from another direction or eventually even two distinct sounds are perceived (these problems are in the following referred to as hearing distortions).

The Internet Engineering Task Force (IETF) has provided a Transport Protocol for Real-Time Applications (RTP) in its Request for Comments RFC 1889, in the following referred to as RTP. The Real-Time Transport Protocol (RTP) includes a control protocol RTCP which provides synchronisation information from data senders and feedback information from data receivers. Regarding the synchronization of streams for media distribution, this protocol provides so-called Sender Reports (SR) which provide a correlation between a sampling clock and a global clock.

The Sender Reports (SR) are sent from the media source to the media sink(s) and contain two timestamps. One timestamp indicates a moment in time in time units of the local sampling clock (local sampling clock time) and the other indicates the same moment in time in time units of the global clock (global clock time). Both timestamps of the SR are created at the same moment. The assumption is made that the global clock time is available to the media source and the media sink(s) between which the media stream is transmitted. A media sink thus has access to the global clock time and can therefore adjust its sampling clock to the global clock.

The main intention of RTP is to provide means for video conferencing in the Internet and to re-synchronize video and audio that is received in separate streams on the same single media sink. The protocol is not intended to ensure the synchronous play-out of media data packets in separate media sinks of a digital transmission audio system. Therefore, when using this protocol for sending out media data packets to media sinks, the media data packets may not be played-out well synchronized in different media sinks, i.e. media data packets belonging to the same stereo signal may not be played-out at the same moment in different media sinks, e.g. loudspeakers. Thus, the above mentioned hearing distortions may occur when using only RTP for digital transmission audio systems.

The problem of hearing distortions may also result from unreliable and unprecise clock information present in most non real-time source devices like personal computers (PCs) or personal digital assistants (PDAs). These devices assume that the global clock information (global clock time) meets all requirements set by the application scenarios. However, this may not be the case. A non real-time device usually gets an actual time (global clock time) for creating timestamps for media data packets via an external connection, e.g. USB or RS232. Because the bus systems that are generally used for this kind of external connection are not designed to allow a transport with very small guaranteed delivery times, the clock information (global clock time) may loose its accuracy when it is used by the PC or PDA, e.g. to determine a timestamp for a media data packet. This means the global clock time indicated by a timestamp of a media data packet may be wrong with respect to the actual global clock time at which the media data packet is actually sent out. Further, the time difference between two times indicated by two timestamps may vary, even though the time difference between the two corresponding actual global clock times do not vary. The reason for this may be that the time required by the external connection to transport the global clock information to the application may vary. Since the timestamps of the media data packets are generally used by the media sinks to determine a play-out time for each packet, the inaccurate and statistically varying time indicated by the timestamps of the media data packets may lead to the mentioned hearing distortions, since media data packets belonging to the same stereo signal may be played-out at different times by the different media sinks.

SUMMARY OF THE INVENTION

It is an object underlying the invention to provide a media source, a media sink, and a media processing system to enable the synchronous play-out of media data packets, as well as corresponding methods according to which these devices work, so that hearing distortions are avoided when sound is played by different media sinks.

A media source to solve the described object according to a first embodiment is defined in a first aspect of the invention, and a media sink is defined in a second aspect of the invention. Further, a corresponding method according to the first embodiment is defined in a third aspect of the invention. Preferred embodiments thereof are respectively defined in further aspects. A media source, a media sink, a media processing system, and corresponding methods to solve the described object according to a second embodiment are also described herein.

Therefore, the object of the invention is solved by two different embodiments, having a common inventive idea for the solution. In both embodiments a common play-out time is determined and associated to each media data packet and the media data packet is played-out by a media sink exactly at this common play-out time. In the first embodiment, the common play-out time is determined by the media sinks by adding a play-out time offset to the time indicated by a timestamp of a media data packet. The play-out time offset is determined by the media source and transmitted to the media sinks. In the second embodiment, the common play-out time is determined by the media source for each packet and sent out together with each media data packet in form of a corresponding timestamp.

Solution According to the First Embodiment of the Invention:

A media source according to the invention is capable of sending out time-stamped media data packets, in particular to one or more receiving media sink(s) as defined below, the timestamp of each media data packet being indicative for the time of creation of the respective media data packet, adapted for determining a play-out time offset, and further adapted for sending out the play-out time offset, in particular to said one or more receiving media sink(s) as defined below.

Preferably, the media source according to the invention comprises a sample clock being capable of determining a sample clock time, is capable of determining a global wallclock time, and is adapted for sending out a control packet once in a while, in particular to said one or more receiving media sink(s) as defined below, said control packet comprising two control packet timestamps indicating the same moment in time, the first control packet timestamp of which being measured or defined in time units of said global wallclock time, the second control packet timestamp of which being measured or defined in time units of said sample clock time.

Further, preferably said timestamp of a media data packet is indicative for the time of creation of said time-stamped media data packet in time units of said sample clock time. Also, the media source is preferably designed for sending out the same media data packets to two or more different receiving media sinks.

A media sink according to the invention is adapted for receiving time-stamped media data packets, in particular from a media source as defined above, and further adapted for determining a play-out time offset, precisely determining a global wallclock time, determining a common play-out time for each received time-stamped media data packet by adding the time indicated by the timestamp of said timestamped media data packet and said play-out time offset, and playing-out each received time-stamped media data packet exactly when the determined common play-out time for the received time-stamped media data packet is reached.

Preferably, the media sink is adapted for receiving said play-out time offset once, in particular from a media source as defined above, and for negotiating said play-out time offset with at least one other media sink. Alternatively, the media sink is capable of receiving a control packet, in particular from a media source as defined above, containing a first control packet timestamp indicating a certain moment in time measured or defined in time units of a sample clock time and a second control packet timestamp indicating the same certain moment in time measured or defined in time units of a global wallclock time, and of converting a time indicated by a timestamp of a time-stamped media data packet measured or defined in units of a sample clock time into a time measured or defined in units of a global wallclock time, based on the information of the first and second control packet timestamp.

In a preferred embodiment, the media sink comprises a buffer which is adapted for storing media data packets until said common play-out time is reached.

A media processing system according to the invention comprises a media source as defined above and a media sink as defined above.

A method according to the first embodiment of the invention, intended for a media source, comprises the steps of sending out time-stamped media data packets, in particular to one or more receiving media sink(s), the timestamp of each media data packet being indicative for the time of creation of the respective media data packet, determining a play-out time offset, and sending out the play-out time offset, in particular to said one or more receiving media sink(s).

Preferably, the following steps are performed: determining a sample clock time, determining a global wallclock time, and sending out a control packet once in a while, in particular to said one or more receiving media sink(s), said control packet comprising two control packet timestamps indicating the same moment in time, the first control packet timestamp of which being measured or defined in time units of said global wallclock time, the second control packet timestamp of which being measured or defined in time units of said sample clock time.

It is further advantageously, that said timestamp of a media data packet is indicative for the time of creation of said time-stamped media data packet in time units of said sample clock time. Further, it is preferable, that the same media data packets are sent out to two or more different receiving media sinks.

A method according to the first embodiment of the invention to enable the synchronous play-out of media data packets, intended for a media sink, comprises the following steps: receiving time-stamped media data packets, in particular from a media source, determining a play-out time offset, precisely determining a global wallclock time, determining a common play-out time for each received time-stamped media data packet by adding the time indicated by the timestamp of said timestamped media data packet and said play-out time offset, and playing-out each received time-stamped media data packet exactly when the determined common play-out time for the received time-stamped media data packet is reached.

Advantageously, said play-out time offset is received once, in particular from a media source or it is negotiated with at least one other media sink.

Further, advantageously, the following steps are performed, receiving a control packet, in particular from a media source according to anyone of claims 1 to 4, containing a first control packet timestamp indicating a certain moment in time measured or defined in time units of a sample clock time and a second control packet timestamp indicating the same certain moment in time measured or defined in time units of a global wallclock time, and of converting a time indicated by a timestamp of a time-stamped media data packet measured or defined in units of a sample clock time into a time measured or defined in units of a global wallclock time, based on the information of the first and second control packet timestamp.

Advantageously, the media data packets are stored in a buffer until said common play-out time is reached.

Within a method according to the first embodiment of the invention to enable the synchronous play-out of media data packets, intended for a media processing system, the steps of the method intended for a media source as defined above and the steps of the method intended for a media sink as defined above are performed.

Solution According to the Second Embodiment of the Invention:

A media source to solve the object of the invention according to the second embodiment of the invention is adapted for determining a play-out time offset and for determining a common play-out time by adding the determined play-out time offset to a current time, and is adapted for sending out time-stamped media data packets, in particular to one or more receiving media sink(s) as defined below, the timestamp of a time-stamped media data packet being indicative for said common play-out time of the media data packet.

Preferably, the media source comprises a sample clock being capable of determining a sample clock time, and is adapted for calculating said current time by reading a global wallclock time only once and adding time periods given by said sample clock to the only once read global wallclock time. Further, preferably, the media source is adapted for sending out the same media data packets to two or more different receiving media sinks.

A media sink according to the second embodiment of the invention is adapted for receiving time-stamped media data packets, in particular from a media source as defined above, is capable of precisely determining a global wallclock time, and of determining a common play-out time for each received time-stamped media data packet which is the time indicated by the timestamp of the time-stamped media data packet. Preferably, the media sink has a buffer which is adapted for storing media data packets until said common play-out time is reached.

A media processing system according to the second embodiment of the invention has a media source as defined above for the second embodiment of the invention and a media sink as defined above for the second embodiment of the invention.

A method according to the second embodiment of the invention to enable the synchronous play-out of media data packets, intended for a media source, comprises the following steps: determining a play-out time offset and a common play-out time by adding the determined play-out time offset to a current time, and sending out time-stamped media data packets, in particular to one or more receiving media sink(s), the timestamp of a time-stamped media data packet being indicative for said common play-out time of the media data packet.

Preferably, the following steps are performed, determining a sample clock time, and calculating said current time by reading a global wallclock time only once and adding time periods given by said sample clock to the only once read global wallclock time. Further, advantageously the same media data packets are sent out to two or more different receiving media sinks.

A method to enable the synchronous play-out of media data packets according to the second embodiment of the invention, intended for a media sink, comprises the following steps receiving time-stamped media data packets, in particular from a media source, precisely determining a global wallclock time, and determining a common play-out time for each received time-stamped media data packet which is the time indicated by the timestamp of the time-stamped media data packet.

Preferably, media data packets are stored in a buffer until said common play-out time is reached.

A method to enable the synchronous play-out of media data packets according to the second embodiment of the invention, intended for a media processing system, comprises the steps of the method intended for a media source and the steps of the method intended for a media sink.

Therewith, according to the invention media sinks can play-out media data packets exactly synchronized, because a common play-out time is determined and associated to a respective media data packet and the media data packets are exactly played-out at this play-out time in each media sink. The exact play-out in time by the media sinks is possible because the media sinks determine the global wallclock time precisely, since they are generally using specific hardware that do not lead to long processing times, i.e. the media sinks are tightly coupled to the global wallclock time. The common play-out time is coupled to a once read global wallclock time, so that there are no time differences between two times indicated by two timestamps of different media data packets as is the case in state of the art systems as mentioned above. The media source according to the invention, on the other hand, might have only limited access to the global wallclock time in terms of accuracy, since the added play-out time offset can be chosen so that this inaccuracy is compensated in any case.

BRIEF DESCRIPTION OF THE SEVERAL VIEWS OF THE DRAWINGS

The invention and advantageous details thereof will be explained by way of exemplary embodiments thereof in the following with reference to the accompanying drawings in which.

DETAILED DESCRIPTION OF THE INVENTION

Figure 1:
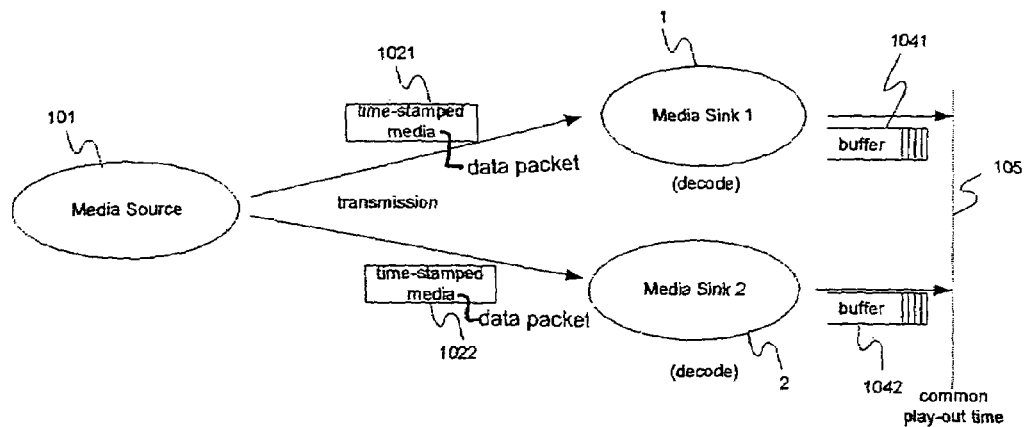
FIG. 1 shows an example of a scenario where a media source sends time-stamped media data packets to two media sinks.

FIG. 1 shows the basic scenario of a media distribution session with two synchronized media sinks, i.e. a first media sink 1 and a second media sink 2. The media source 101 transmits a first timestamped media data packet 1021 to the first media sink 1 and a second timestamped media data packet 1022 to the second media sink 2. The timestamp of a media data packet indicates the time the media data packet was generated by the source. The first media sink 1 and the second media sink 2 decode the media data packets in case of encoded data. The data is then stored in respective buffers, i.e. a first buffer 1041 of the first media sink 1 and a second buffer 1042 of the second media sink 2 until the common play-out time 105 for the respective packet is reached. This common play-out time 105 is determined by the media sinks for each packet by adding a once determined play-out time offset to the time indicated by the timestamp of a media data packet. If the common play-out time 105 for a packet is reached the media data packet is played-out by the media sink. In the example of FIG. 1, the timestamps of the first media data packet 1021 and the second media data packet 1022 indicate the same moment in time. Therefore, these media data packets are played-out by the first media sink 1 and the second media sink 2 at exactly the same moment.

The play-out time offset has to be negotiated among the media source 101 and all sinks of a media session (here the first media sink 1 and the second media sink 2), taking into account the transmission time periods, the decoding time periods, the available buffer sizes, and an eventual lax synchronisation of the media source 101 to a global wallclock time.

For clocks, it is assumed that in a media-streaming device two clocks are available (accessible): the sample clock and the global wallclock. The sample clock is the clock that is inherent in the media stream. For a CD as an example of a source of an audio stream this sample clock is running with 44.1 kHz. The global wallclock can be read by all source and sink devices participating in a media session. For IP networks, the Network Time Protocol (NTP) describes how a NTP clock can be maintained throughout a network. However, for applications with tight requirements, such as synchronizing two stereo channels, the accuracy and clock resolution of such an NTP clock may not be sufficient. Therefore it is assumed that a clock with much higher accuracy and resolution is available. This is the case in some wireless systems that need a common clock among all peers in order to execute a synchronized frequency hopping. One example for such a wireless system is given according to the BLUETOOTH specification, where all participants of a piconet maintain a common clock. The time of the common clock can be used by media applications as the global wallclock time. Usually, the sample clock time and the global wallclock time are measured in different units. For example, the global wallelock may tick in units of microseconds, whereas the sample clock may tick in units of single samples as smallest unit.

For timestamps, it is assumed that they are principally used the way as described in RTP. This means a timestamp of a media data packet specifies the moment in time the first sample of the packet was created in time units of the sample clock. In addition to the media stream which transmits media data packets according to RTP, control packets are exchanged among the participants, i.e. among the media sources and media sinks of a stream. These control packets contain no media data, but among other information two timestamps indicating the same moment in time, one timestamp indicates the time in time units of the sample clock and the other timestamp indicates the same moment in time in time units of the global wallclock time. With this information, a media sink can determine a sample clock time, if a global wallclock time is given, and vice versa it can determine a global wallclock time, if a sample clock time is given. Therefore, control packets fulfill the function of associating the source sample clock time with the global wallclock time. It is thus possible for a media sink to determine the moment in time a media data packet was generated in time units of the global wallclock time, by converting the time indicated by the timestamp of the media data packet which is given in time units of the sample clock.

Figure 2:
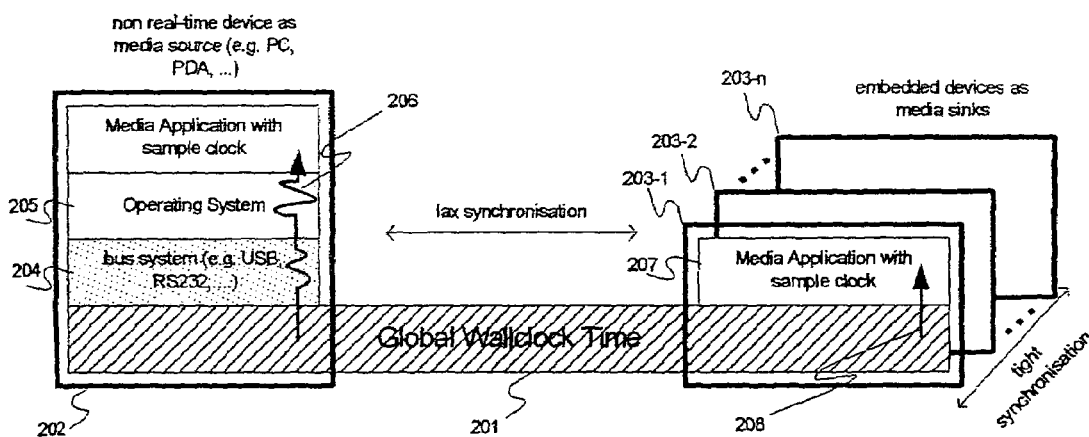
FIG. 2 shows the access of the media source and n media sinks to the same global wallclock time.

In FIG. 2 the assumption is made that there is a global wallclock time 201 available to the media source 202 and all n media sinks, i.e. media sinks 203-1, 203-2, . . . ,203-n. This global wallclock time can for example be the time of the clock that is used by digital bus systems or wireless digital transmission systems. Furthermore, it is assumed that this clock fulfills the requirements in terms of accuracy and resolution concerning the desired synchronization. Typically, such a clock is located very close to the physical layer, e.g. in the baseband of such a transmission system. For general-purpose devices like a PC or a PDA 202, this means that such a clock is external and can only be accessed via an external connection 204, e.g. USB or RS232. One example for this is a BLUETOOTH module that is connected to a PC via USB. The BLUETOOTH baseband clock is synchronized automatically by all devices within a piconet, because this clock information is used to synchronize the frequency hopping of all piconet participants. The native BLUETOOTH clock information then has to be transported from the BLUETOOTH module to the PC via the USB bus system.

Because the bus systems that are generally used for this kind of external connection are not always designed to allow a transport with very small guaranteed delivery times, the clock information may loose its accuracy (validity) when it is transported through such a bus system. For example, clock information of an accuracy of a few microseconds looses a lot of its value when it is transported through a bus system that introduces a delay of a few milliseconds, especially when this delay is subject to a random variation of a few milliseconds, i.e. the time that is used e.g. to generate a timestamp may not any longer be valid. In addition, a non real-time operating system 205 that typically is running on general-purpose devices like PCs and PDAs introduces even more uncertainty to the clock information. In FIG. 2, the zigzagged arrow 206 through the layers of media source 202 represents this uncertainty and inaccuracy of the clock information that is received by the media application.

On the other hand, as media sinks, i.e. the n media sinks 203-1, 203-2, . . . , 203-n, typically single-purpose devices (embedded devices) are used, e.g. loudspeakers. Such a single-purpose device can be implemented as an embedded system. This allows a much more direct path to the global wallclock time, i.e. the global wallclock time can be precisely determined. For example, the media application 207 can run on the baseband processor of the transmission system. This means that the media application can have a very direct access to the clock with no significant delay and no significant uncertainty. Therefore, precise clock information with an accuracy of a few microseconds is available to the media application 207 of the media sink, because it is not transported through any slow bus system. The straight arrow 208 within the n media sinks 203-1, 203-2, . . . , 203-n in FIG. 2 indicates this direct access.

As indicated in FIG. 2, this invention utilizes the fact that multiple media sinks, i.e. the n media sinks, can be synchronized among themselves very tightly due to their direct access to the global clock, whereas for the source device, a lax synchronization to the sink devices is acceptable. For example, when streaming stereo audio data from a CD-player to two loudspeakers, the delay from sending a packet from the CD-player until it is played-out at the speakers may be a few milliseconds, but the delay between the left and right speaker may only be a few microseconds. Appropriate buffering in the media sinks therefore can compensate the uncertainty of the clock information on the source side. Because the available clock information on the media source is less accurate and less reliable than on the media sink, the synchronization that is achieved on this basis can be called 'Asymmetric Synchronization'.

The global wallclock time is preferably only read once on the source side at the very beginning of the streaming session in order to couple the sample clock to the global wallclock time. This clock information can be used to compile the timestamps of the first control packet that is transmitted to the media sinks. For global wallclock timestamps in subsequent control packets, however, the difference in time can then be calculated by counting the number of samples rather than reading the global wallclock time again. This is due to the fact that the variation of the delivery time of the global wallclock information generally is too large and would lead to gaps or jumps in the play-out on the sink side.

Figure 3:
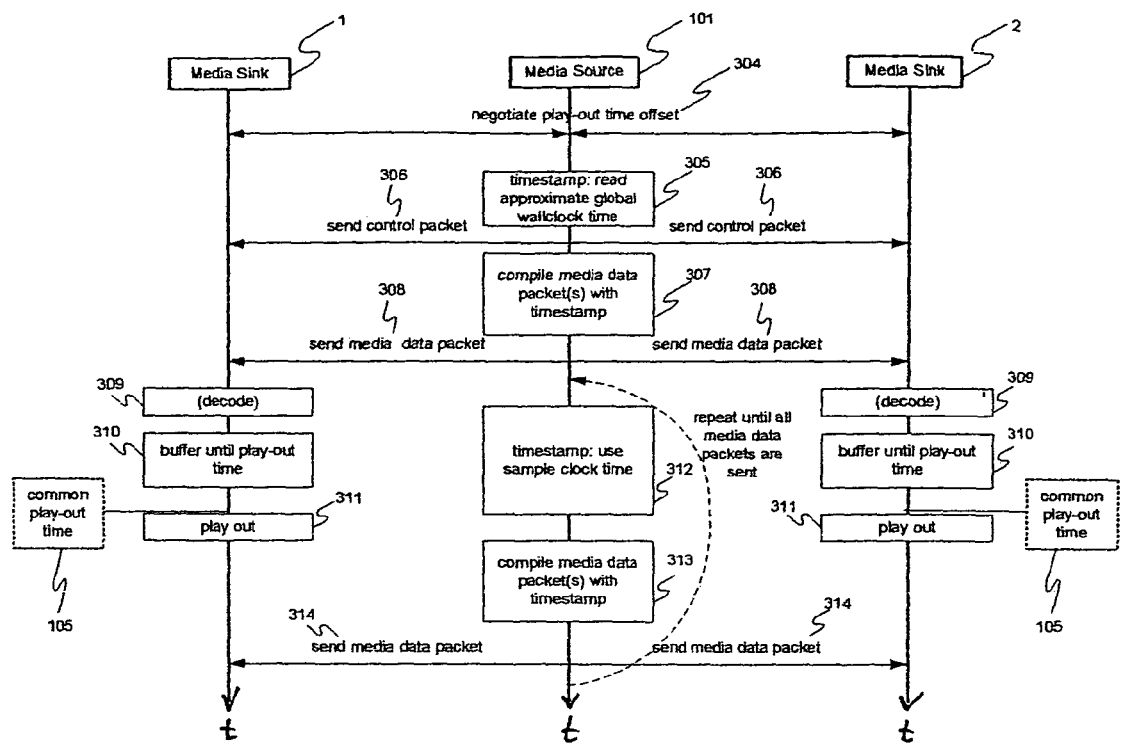
FIG. 3 shows a flowchart to illustrate the process of sending media data packets from a media source to two media sinks that receive and process the media data packets.

In FIG. 3 the media source 101 sends media data packets to the first media sink 1 and the second media sink 2. At the beginning of the procedure, a play-out time offset has to be negotiated (determined) in a step 304. This negotiated play-out time offset is transmitted to both media sinks, i.e. the first media sink 1 and the second media sink 2, and is further used by the media sinks to determine a common play-out time for each packet. A media data packet timestamp indicates the moment in time a packet was created in time units of the sample clock. To determine a common play-out time, i.e. the moment in time a sink physically has to play-out a media data packet, the time indicated by the timestamp of the media data packet is converted into a global wallclock time in time units of the global wallclock time and the negotiated play-out time offset is added to this global wallclock time. For the negotiation of the play-out time offset, the expected transmission time, a potential decoding time and the available media sink buffer sizes have to be taken into account. Because the global wallclock time information on the source side can be inaccurate and subject to a statistical variation, the source has to add the worst-case variation time to the play-out time offset. This avoids the situation that the common play-out time has already elapsed once a media data packet reaches the sink.

Even though the global wallclock time of the media source suffers from the above-mentioned variation, it is read once in a step 305 in the beginning of a media streaming session in order to couple the source sample clock to the global wallclock time. In a following step 306 a control packet with two timestamps is transmitted to the first media sink 1 and the second media sink 2. Both of the timestamps of the control packets describe the same moment in time, one timestamp indicates the moment in time in time units of the source sample clock and the other timestamp indicates the moment in time in time units of the global wallclock time. Thus, a media sink, which receives this control packet can determine the moment in time a media data packet was generated in time units of the global wallclock time using the time indicated by the timestamp of the media data packet in time units of the sample clock.

In the next step 307, the media data packets for each sink are compiled and time-stamped with the time of their creation in time units of the source sample clock. In case a separate stream is sent to each sink, this has to be done for each stream. In case that one stream is multicast to multiple sinks, this only has to be done for this one stream. In the example of FIG. 3 there is only one stream that is sent to both media sinks. Therefore, in step 308, a media data packet of the stream is sent out to the first media sink 1 and the second media sink 2.

In the next step 309, each sink decodes the data in case it is encoded data. Also, in this step 309, a sink converts the time indicated by the timestamp of the received media data packet into a time in units of the global wallclock time. Then, each sink determines the common play-out time by adding the negotiated play-out time offset, which is given in units of the global wallclock time, to the converted time indicated by the timestamp of the received media data packet. In the next step 310 each sink buffers the media data until the determined common play-out time arrives. These buffers in the media sinks have to be large enough to compensate for the random variation of the clock information in the media source, the random variation of the transmission delay and a possible variation of the decoding delay. With the arrival of the common play-out time 105, each sink physically plays out the media in the next step 311.

For any timestamp of subsequently transmitted media data packets from the media source 301 to the first media sink 1 and the second media sink 2, the media source 301 uses the sample clock time in step 312 to determine the time for the timestamp rather than reading the global wallclock time again. This ensures, that no gaps or jumps occur on the sink side due to the inaccuracy of the wallclock time in the source media application. In step 313, the sample clock time is used instead of a read wallclock time for the timestamp for the next media data packet sent from the source to the sink. In step 314 media data packets are sent to each media sink, i.e. the first media sink 1 and the second media sink 2, with the timestamp that indicates the time of their creation given by the source sample clock. The timestamp of a media data packet is generally included in the media data packet as a header information. However, it may also be sent in separate timestamp packets.

As can be seen in FIG. 3, steps 312, 313, and 314 are repeated until all media data packets of a session are sent out, i.e. new timestamps are calculated, media data packets are compiled with these timestamps and these media data packets sent out to the media sinks.

As a result of such a procedure, the source media application needs only to be coupled loosely to the global wallclock time, whereas each media sink is coupled tightly to the global wallclock time. Therefore, if a non real-time device like a PC or PDA is used as a media source and loudspeakers are used as media sinks, the loudspeakers can be synchronized very tightly among themselves, fulfilling the tight requirements derived from human perception of spatial audio.

Figure 4:
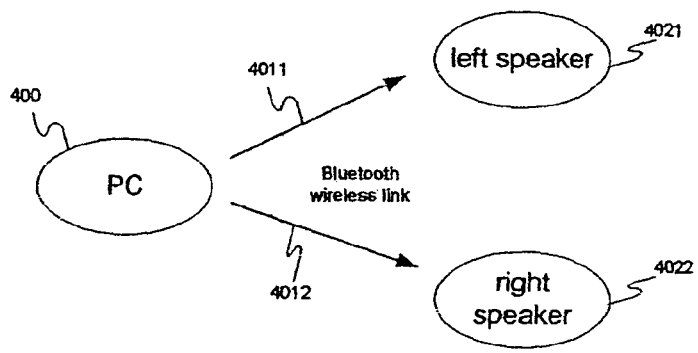
FIG. 4 shows an example where a PC is used as media source and two loudspeakers are used as media sinks.

FIG. 4 shows a possible scenario where the procedure according to the invention can be applied. A BLUETOOTH equipped PC 400 is multicasting a stereo audio stream in form of media data packets to two BLUETOOTH loudspeakers, i.e. a first BLUETOOTH loudspeaker 4021 and a second BLUETOOTH loudspeaker 4022, via two BLUETOOTH links, i.e. a first BLUETOOTH link 4011 and a second BLUETOOTH link 4012. In each link the media data packets of one audio signal of a stereo signal are transmitted to the respective loudspeaker.

The BLUETOOTH module on the PC 400 is connected via USB, whereas in the first BLUETOOTH loudspeaker 4021 and the second BLUETOOTH loudspeaker 4022 BLUETOOTH embedded directly into the system design. The global wallclock time to be used by the PC and the BLUETOOTH loudspeakers is the BLUETOOTH baseband clock inherent in each BLUETOOTH baseband implementation. This BLUETOOTH baseband clock is very well synchronized among all participants of a BLUETOOTH piconet.

The PC 400 as the media source of the audio stream starts with evaluating the quality and delay of the BLUETOOTH transmission to the first BLUETOOTH loudspeaker 4021 and the second BLUETOOTH loudspeaker 4022 using the information that is provided by the control packets as defined in RTP. Further, the PC queries the time needed for decoding and the buffer capabilities from each speaker using appropriate signaling commands. With this information and the random variation of the clock information of the PC, i.e. a maximum possible variation, the PC can determine a play-out time offset. This play-out time offset is transmitted to the first BLUETOOTH 19 loudspeaker 4021 and the second BLUETOOTH loudspeaker 4022 once and is added to the time indicated by the timestamp of each media data packet of a media stream to get the common play-out time for each media data packet. In an alternative embodiment of the invention, a common play-out time may be determined by the media source, here the PC 400, for each media data packet and then transmitted together with each media data packet, as described in connection with FIG. 6 below.

The PC 400 as the media source of the stream creates the timestamps. When RTP media data packets are sent, the timestamps in the media data packets describe the moment in time the packet was created in time units of the sample clock. The link to the global wallclock time, here the BLUETOOTH baseband clock, is achieved by supplying two timestamps for the same moment in time in the RTCP control packets, one timestamp indicating the moment in time in units of the sample clock and the other one in units of the global wallclock, as described above. Because of the inaccuracy of the clock information available on the PC side, however, the baseband clock is preferably actually read only for the first control packet. For consecutive control packets, the time information for the global wallclock timestamp is created by counting the number of samples passed since the last control packet and then translating this number of samples into time in units of the global wallclock. As mentioned above, a control packet has a global wallclock timestamp indicating a moment in time in time units of the global wallclock time and a sample clock timestamp indicating the same moment in time in time units of the sample clock time. Therefore, by combining the information provided by the various timestamps present in the media data packets and the control packets, each BLUETOOTH loudspeaker can determine the moment in time at which a packet was created by the source in time units of the global wallclock time from the timestamp of a media data packet, which indicates the time of creation in time units of the sample clock. By adding the negotiated play-out time offset, it is then determined when the samples from each media data packet have to be played-out. Because each sink can access the BLUETOOTH baseband clock directly, all sinks are able to synchronize their sample play-out clocks tightly to the BLUETOOTH baseband clock.

Because the clock information is imprecise to a certain extent on the source side, the first BLUETOOTH loudspeaker 4021 and the second BLUETOOTH loudspeaker 4022 as the media sinks of the audio have to compensate for this inaccuracy with a suitable buffer size. For example, the PC 400 knows that the clock information has a maximum variation of 2 ms. Therefore, in order to avoid the situation that the play-out time of a media data packet has already elapsed once the media data packet reaches the sink it includes these 2 ms in the negotiated play-out time offset. With 2 ms variation, the timestamps created by the source will be 1 ms too early or 1 ms too late in the worst case. Therefore, the sinks have to provide enough memory to buffer the data for this worst-case period that is always added by the source device in order to be on the safe side.

Figure 5:
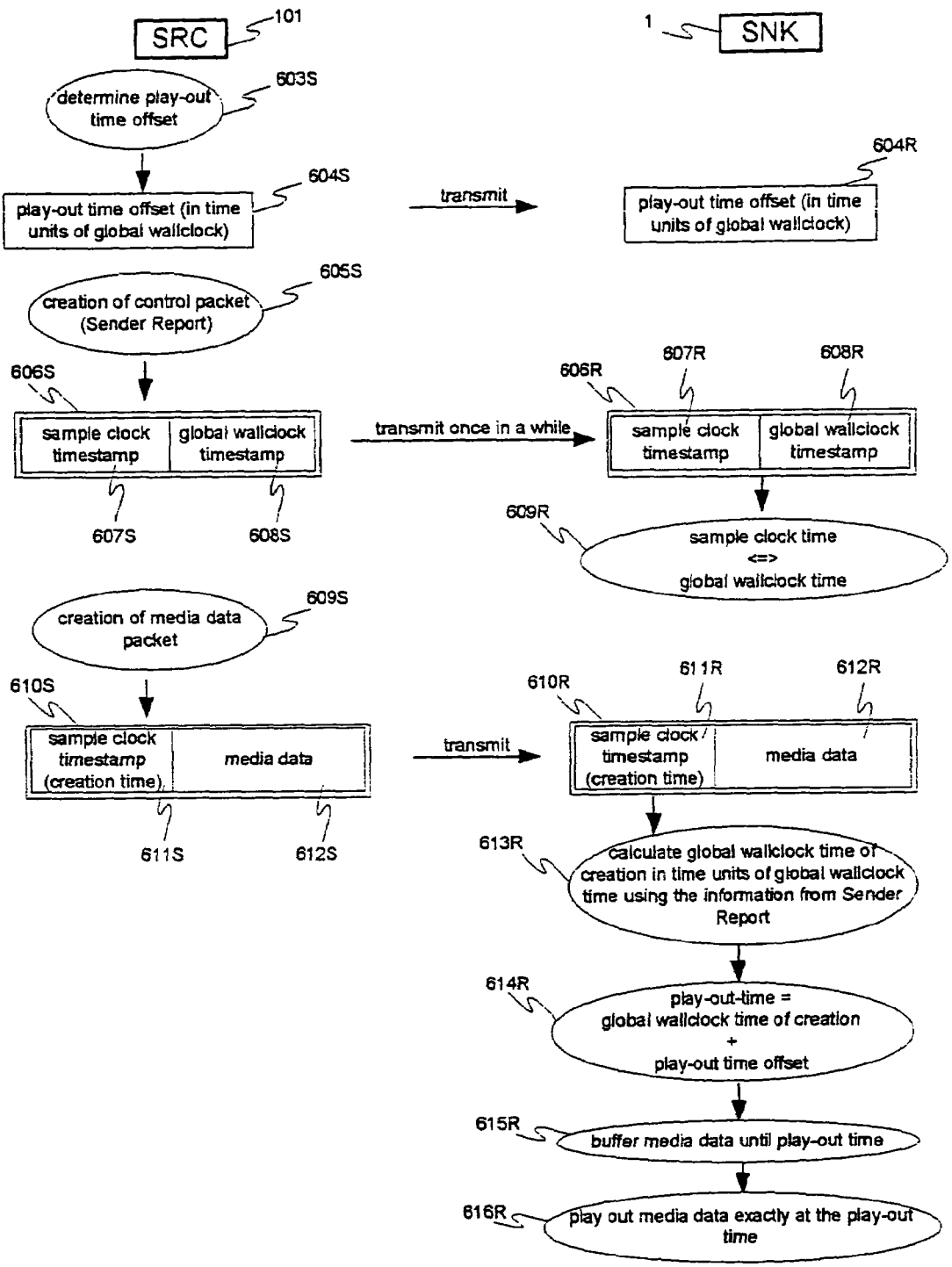
FIG. 5 shows a flowchart illustrating the interaction of the media source and the media sink, wherein control packets according to the RTP standard are used.

FIG. 5 shows a flowchart illustrating the sending process at the media source 101 and the receiving process at the media sink 1 according to the invention, where the play-out time for each media data packet is determined by the media sink. This example is based on RTP standard. In a first step 603S the play-out time offset is determined (negotiated) by the media source 101 taking into account the transmission time periods, the decoding time periods and the available buffer sizes of the media sinks participating in the media streaming session. To get these informations, the media source 101 queries the media sink 1. The play-out time offset is then in form of a data control packet 604S transmitted to the media sink 1. This data control packet 604S contains the play-out time offset in time units of the global wallclock. The media sink 1 receives the transmitted data control packet 604R, which corresponds to the data control packet 604S that was sent out by the media source 101. The media sink 1 stores the play-out time offset in units of the global wallclock time in order to determine the play-out time of subsequently received media data packets, as described below.

Before any media data packets are sent from the media source 101 to the media sink 1 a sender report packet is sent from the media source 101 to the media sink 1. Therefore, in the following step 605S, a sender report packet 606S is created. The sender report packet 606S contains two timestamps, a sample clock timestamp 607S indicating a moment in time in time units of the sample clock and a global wallclock timestamp 608S indicating the same moment in time in time units of the global wallclock. The sender report packet 606S is transmitted from the media source 101 to the media sink 1 once in a while. It is transmitted at least once before every media streaming session, however it may also be transmitted in the middle of a media streaming session. The media sink then receives the transmitted sender report packet 606R containing the transmitted sample clock timestamp 607R and the transmittted global wallclock timestamp 608R. Since both of these timestamps indicate the same moment in time, in the following step 609R, the media sink 1 can associate the sample clock time with the global wallclock time. This means, for subsequently received timestamps the media sink 1 can determine a sample clock time, if a global wallclock time is given by the respective timestamp, and vice versa it can determine a global wall glock time, if a sample clock time is given.

In a subsequent data preparation step 609S, the media source 101 creates a media data packet 610S. This media data packet 610S contains a sample clock timestamp indicating the creation time of the media data packet 610S in time units of the sample clock and, further, it contains media data 612S. This media data packet 610S is transmitted to the media sink 1. The media sink 1 receives the transmitted media data packet 610R containing the transmitted sample clock timestamp 611R indicating the creation time of the transmitted media data packet 610R in time units of the sample clock and the transmitted media data 612R. The media sink 1 then, in a first calculation step 613R, calculates the global wallclock time of creation in time units of the global wallclock time using the information provided by the transmitted sender report packet 606R received earlier. Now, in a second calculation step 614R, the play-out time can be determined in time units of the global wallclock time by adding the calculated global wallclock time of creation and the play-out time offset. Then, in a buffering step 615R, the transmitted media data 612R is buffered until the determined play-out time in time units of the global wallclock time arrives. Finally, in a play-out step 616R, the media data is physically played-out exactly at the determined play-out time, which is now known in time units of the global wallclock time by the media sink 1. As mentioned above, the exact play-out in time is possible, because the media sink 1 has a direct (tight) access to the global wallclock time.

For subsequent media data packets of a media streaming session the data preparation step 609S, the transmission of media data packets from the media source 101 to the media sink 1, the first calculation step 613R, the second calculation step 614R, the buffering step 615R, and the play-out step 616R are repeated. As mentioned above, within such a media streaming session it may also be possible that a sender report packet 606S is sent once in a while from the media source 101 to the media sink 1.

Figure 6:
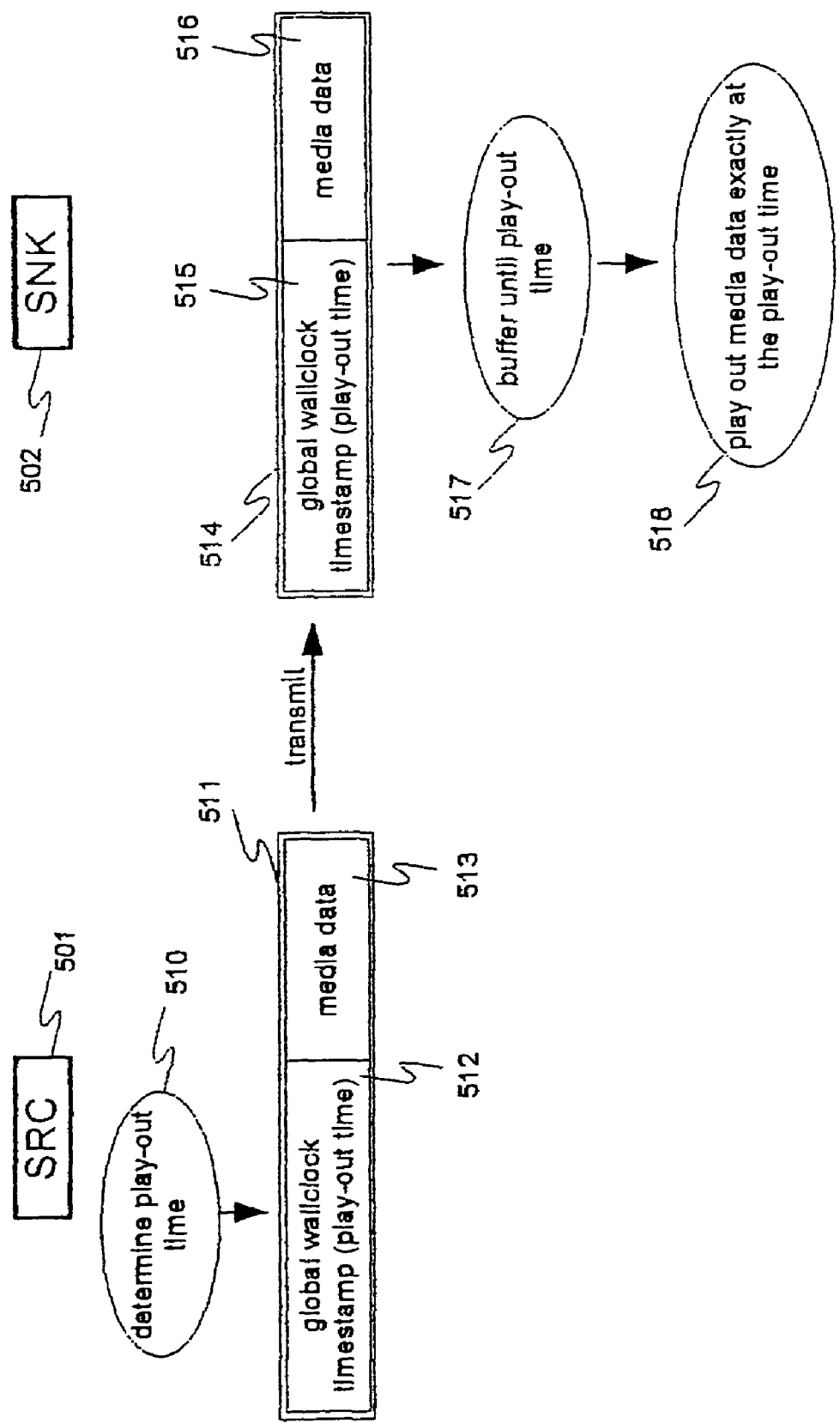
FIG. 6 shows a flowchart illustrating the interaction of the media source and the media sink according to a first alternative embodiment of the invention.

FIG. 6 shows a flowchart illustrating the sending process at the media source 501 and the receiving process at the media sink 502 according to a first alternative embodiment of the invention, where the play-out time for each packet is determined by the media source 501 and transmitted with each media data packet. The illustrated process is executed for each media data packet sent from the media source (SRC) 501 to the media sink (SNK) 502. It should be mentioned, that FIG. 6 shows the process at only one media sink 502 participating in a media streaming session. The same process is executed by other media sinks participating in the same media session.

In a first step 510 the play-out time is generated for the media data packet 511 that is sent out next. The play-out time depends on the random variation of the clock information of the media source 501, the transmission time periods, the decoding time periods and the available buffer sizes of the media sinks participating in the media streaming session. As above, these informations are negotiated between the media source 501 and the media sink 502. The media data packet 511 contains the media data 513 and the global wallclock timestamp 512 that indicates the play-out time for the media data packet 511 in units of the global wallclock time. This media data packet 511 is transmitted to the media sink 502. The transmitted media data packet 514 contains the media data 516 and the global wallclock timestamp 515 which correspond to the media data 513, and the global wallclock timestamp 512, respectively that were sent out by the media source 501. After receiving the transmitted media data packet 514, in a processing step 517, the media sink 502 buffers the media data 515 until the play-out time indicated by the transmitted global wallclock timestamp 515 arrives. Then, in a play-out step 518, the media data is physically played-out exactly at the determined play-out time, which is indicated by the global wallclock timestamp 515, by the media sink 502. As mentioned above, the exact play-out in time is possible, because the media sink 502 has a direct (tight) access to the global wallclock time. For user scenarios with tight timing requirements, like synchronizing the left and right channel of a stereo distribution, this access to the clock information is a critical point.

In order to negotiate (schedule) a play-out time, all devices need access to the same clock information (global wallclock time) as a common time reference. Then, the media source can schedule a media data packet and all sinks have to buffer the media data packet until the scheduled global wallclock time has arrived.

Figure 7:
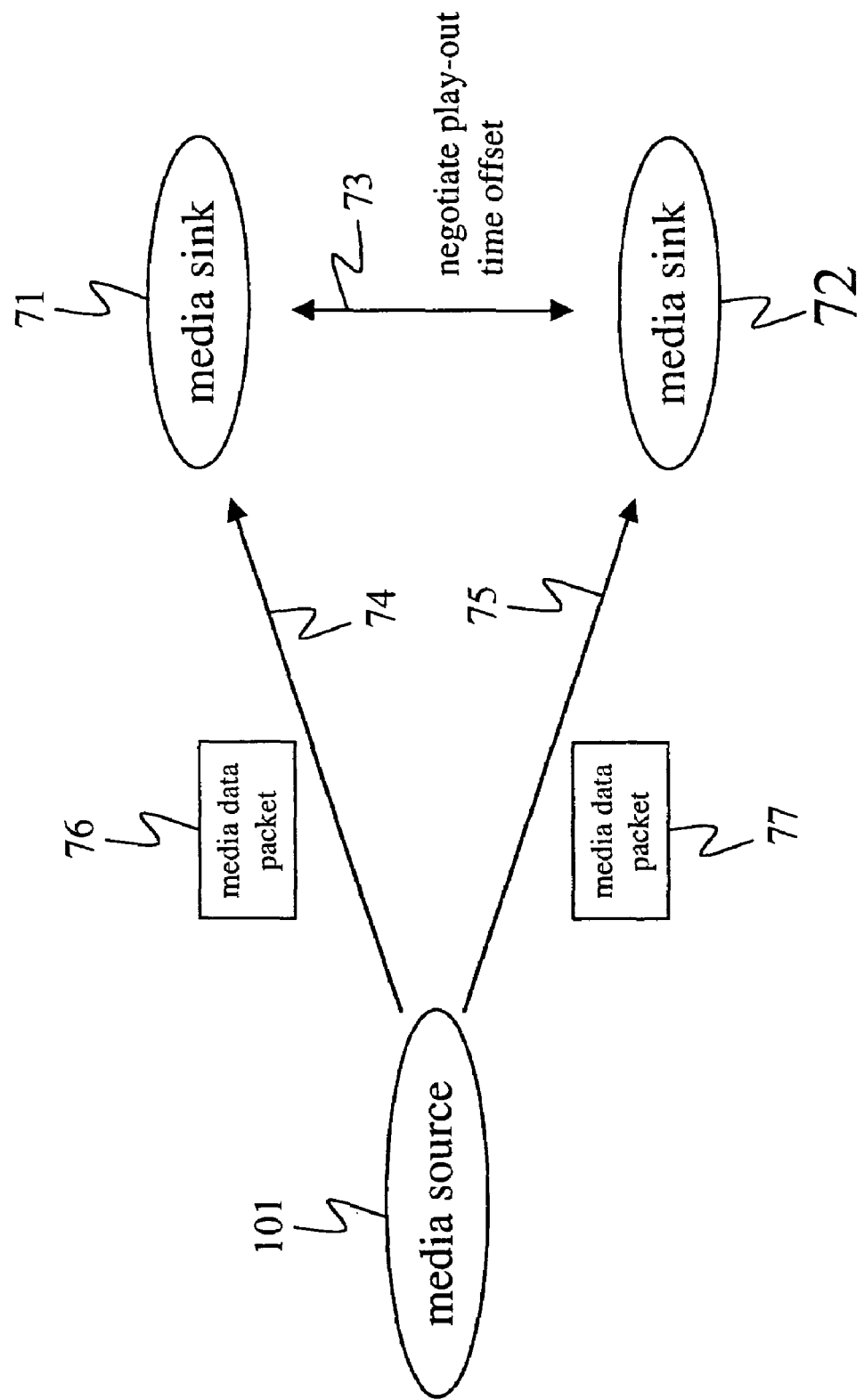
FIG. 7 shows a second alternative embodiment of the invention, wherein the media sinks negotiate a play-out time offset among themselves.

FIG. 7 shows a second alternative embodiment of the invention, where the media sinks negotiate the play-out time offset themselves. In this second alternative embodiment, a third media sink 71 and a fourth media sink 72 negotiate a play-out time offset taking into account the transmission time periods, the decoding time periods, the available buffer sizes and an eventual lax synchronisation of the media source 101 to a global wallclock time. The third media sink 71 and the fourth media sink 72 may negotiate the play-out time offset via a direct data link 73 (direct communication channel), or they may negotiate the play-out time offset via a first data link 74 and a second data link 75 over the media source 101 (indirect communication channel). The first data link 74 connects the media source 101 and the third media sink 71 and the second data link 75 connects the media source 101 and the fourth media sink 72. After the play-out time offset is negotiated by the third media sink 71 and the fourth media sink 72, the media source 101 starts sending timestamped media data packets via the first data link 74 and the second data link 75. In the example of FIG. 7 a third timestamped media data packet 76 is sent via the first data link 74 and a fourth timestamped media data packet 77 is sent via the second data link 75. The timestamps of the media data packets may indicate the time of their creation in time units of the global wall clock time or they may indicate the time of their creation in time units of the sample clock time. In the latter case, a procedure according to FIG. 5 must be executed before media data packets are sent, i.e. a control packet must be sent from the media source 101 to the third media sink 71 and the fourth media sink 72, such that the third media sink 71 and the fourth media sink 72 can determine the time of creation of a media data packet in time units of the global wallclock time. After the third media sink 71 and/or the fourth media sink 72 received a media data packet, they determine the play-out time for the received media data packet by adding the negotiated play-out time offset to the time indicated by the timestamp of the media data packet. In the example, the third media sink 71 determines the play-out time for the third timestamped media data packet 76 by adding the negotiated play-out time offset to the time indicated by the timestamp of this third timestamped media data packet 76, and plays-out the third timestamped media data packet 76 exactly at this determined play-out time. Further, the fourth media sink 72 determines the play-out time for the fourth timestamped media data packet 77 by adding the negotiated play-out time offset to the time indicated by the timestamp of this fourth timestamped media data packet 77, and plays-out the fourth timestamped media data packet 77 exactly at this determined play-out time.

To summarize, according to the present invention, in a digital audio transmission system advantageously media data packets are sent from a media source to media sinks (e.g. loudspeakers). If a media data packet is received by a media sink and contains audio data belonging to an audio signal of e.g. a stereo signal, it is important that this media data packet is played-out at the same moment as a media data packet containing an audio signal of the same stereo signal received by another media sink, i.e. the media data packets must be played-out synchronously. To ensure this synchronous play-out of media data packets in different media sinks, a common play-out time is determined by the media source or the media sink and media data packets are buffered until this common play-out time is reached. The media source or the media sink determine the common play-out time on the basis of a global wallclock time, which is calculated on the basis of a sample clock time.

The invention claimed is:

1. A media source, comprising:
   a global clock determination unit configured to determine, once within a session, a global wallclock time having a first statistical variation;
   a sample clock determination unit configured to determine a sample clock time;
   a communications unit configured to send out, only once within the session, a control packet to one or more receiving media sinks, said control packet including two control packet timestamps, one of the control packet timestamps defining a moment in time in time units of said global wallclock time, another of the control packet timestamps defining the moment in time in time units of said sample clock time;

a sending unit configured to send out time-stamped media data packets to the one or more receiving media sinks, each of the time-stamped media data packets including a timestamp that is a time of creation of the time-stamped media data packet;

a determining unit configured to determine a play-out time offset based, in part, on the first statistical variation; and a transmission unit configured to send out the play-out time offset to said one or more receiving media sinks once for all time-stamped media data packets of the session.

2. The media source according to claim 1, wherein the sending unit is configured to send out the time-stamped media data packets, wherein each timestamp is the time of the creation of the respective time-stamped media data packet in the time units of said sample clock time.

3. The media source according to claim 1, wherein said sending unit is configured to send out the same time-stamped media data packets to two or more different receiving media sinks.

4. The media source according to claim 1, wherein the determining unit is configured to determine the play-out time offset, which is a basis for determining, for the one of the time-stamped media data packets, a play-out time for playing out content included in the one of the time-stamped media data packets at said one or more receiving media sinks, said play-out time being determined based on adding the play-out time offset to the time of the creation of the one of the time-stamped media data packets.

5. The media source according to claim 1, wherein
the sending unit is configured to send out the time-stamped media data packets, each of the time-stamped media data packets including media data; and
the global wallclock time is provided to the media source and said one or more receiving media sinks.

6. The media source according to claim 1, wherein
the sample clock time corresponds to media data included in the time-stamped media data packets; and
the global wallclock time is provided to the media source and said one or more receiving media sinks.

7. The media source according to claim 1, wherein the play-out time offset is used at the one or more receiving media sinks as a basis for determining, for each of the media data packets, a common play-out time based on the global wallclock time, the common play-out time of a certain media data packet being used for playing out the certain media data packet at the common play-out time at each of the one or more media sinks, the global wallclock time being determined at each of the one or more receiving media sinks with a second statistical variation, the second statistical variation being smaller than the first statistical variation.

8. The media source according to claim 1, wherein
the global clock determination unit is configured to determine the global wallclock time from a baseband clock conforming to BLUETOOTH; and
the communications unit is configured to send out the control packet including the two control packet timestamps, the one of the control packet timestamps defining the moment in time in time units of the baseband clock conforming to BLUETOOTH.

9. A media sink, comprising:
a receiving unit configured to receive a control packet, time-stamped media data packets, and a play-out time offset from a media source, the control packet including two control packet timestamps, one of the control packet timestamps defining a moment in time in time units of a global wallclock time, another of the control packet timestamps defining the moment in time in time units of said sample clock time, the global wallclock time having a statistical variation, the play-out time offset being received once for all time-stamped media data packets of a session;
a determining unit configured to determine the global wallclock time;
an addition unit configured to determine a common play-out time of one of the time-stamped media data packets by adding a time, which is a timestamp included in the one of the time-stamped media data packets, and the play-out time offset; and
a play-out unit configured to play-out the one of the time-stamped media data packets when the determined common play-out time of the one of the time-stamped media data packets is reached, wherein
the receiving unit is configured to receive the play-out time offset, which is based, in part, on the statistical variation.

10. The media sink according to claim 9, further comprising:
a conversion unit configured to convert the time, which is defined in the time units of said sample clock time, into a time defined in the time units of the global wallclock time, based on the two control packet timestamps.

11. The media sink according to claim 10, wherein the sample clock time corresponds to media data included in the time-stamped media data packets.

12. The media sink according to claim 9, further comprising:
a buffer configured to store the time-stamped media data packets until said common play-out time is reached.

13. The media sink according to claim 9, wherein the time-stamped media data packets include media data.

14. A method, implemented by a media source, for synchronously playing-out media data packets, the method comprising:
determining, once within a session, at the media source, a global wallclock time having a statistical variation;
determining a sample clock time;
sending out, only once within the session, a control packet to one or more receiving media sinks, said control packet including two control packet timestamps, one of the control packet timestamps defining a moment in time in time units of said global wallclock time, another of the control packet timestamps defining the moment in time in time units of said sample clock time;
sending out time-stamped media data packets to said one or more receiving media sinks, each of the time-stamped media data packets including a timestamp, the timestamp being a time of creation of the time-stamped media data packet;
determining, at the media source, a play-out time offset based, in part, on the statistical variation; and
sending out the play-out time offset to said one or more receiving media sinks once for all time-stamped media data packets of the session.

15. The method according to claim 14, wherein, in the sending out the time-stamped media data packets, the timestamp is the time of the creation of the one of the time-stamped media data packets in the time units of said sample clock time.

16. The method according to claim 14, wherein the sending out the time-stamped media data packets includes sending out the same time-stamped media data packets to two or more different receiving media sinks.

17. The method according to claim 14, further comprising:
determining, for the time-stamped media data packets, a play-out time for playing out content included in the time-stamped media data packets at said one or more receiving media sinks, the play-out time being determined based on adding the play-out time offset to the time of the creation of the respective time-stamped media data packets.

18. The method according to claim 14, wherein
in the sending out the time-stamped media data packets step, the time-stamped media data packets include media data; and
the global wallclock time is provided to the processor and said one or more receiving media sinks.

19. The method according to claim 14, wherein
in the determining the sample clock time step, the sample clock time corresponds to media data included in the time-stamped media data packets; and
in the determining the global wallclock time step, the global wallclock time is provided to the media source and said one or more receiving media sinks.

20. A system, comprising:
a media source including,
  a global clock determination unit configured to determine, once within a session, a global wallclock time having a statistical variation;
  a sample clock determination unit configured to determine a sample clock time;
  a communications unit configured to send out, only once within the session, a control packet to one or more receiving media sinks, said control packet including two control packet timestamps, one of the control packet timestamps defining a moment in time in time units of said global wallclock time, another of the control packet timestamps defining the moment in time in time units of said sample clock time;
  a sending unit configured to send out a time-stamped media data packet to a media sink, the time-stamped media data packet including a timestamp that is a time of creation of the time-stamped media data packet,
  an offset determining unit configured to determine a play-out time offset, based, in pan, on the statistical variation, and
  a transmission unit configured to send out the play-out time offset to the media sink once for all time-stamped media data packets of the session,
the media sink including,
  a receiving unit configured to receive the time-stamped media data packet and the play-out time offset from the media source, the play-out time offset being received once for all time-stamped media data packets of the session,
  a determining unit configured to determine the global wallclock time,
  an addition unit configured to determine a common play-out time of the time-stamped media data packet by adding the play-out time offset and the time of the creation of the time-stamped media data packet, and
  a play-out unit configured to play-out the time-stamped media data packet when the determined common play-out time of the time-stamped media data packet is reached.

21. The system according to claim 20, wherein the media source includes a sample clock determination unit configured to determine the sample clock time, the sample clock time corresponding to media data included in the time-stamped media data packet.

22. The system according to claim 21, wherein the sending unit is configured such that said timestamp is the time of the creation of the time-stamped media data packet in the time units of said sample clock time.

23. A method, implemented by a media source and one or more receiving media sinks, the method comprising:
determining, once within a session, at the media source, a global wallclock time having a statistical variation;
determining a sample clock time;
sending out, only once within the session, from the media source, a control packet to the one or more receiving media sinks, said control packet including two control packet timestamps, one of the control packet timestamps defining a moment in time in time units of said global wallclock time, another of the control packet timestamps defining the moment in time in time units of said sample clock time;
sending out a time-stamped media data packet to the one or more receiving media sinks, the time-stamped media data packet including a timestamp that is a time of creation of the time-stamped media data packet;
determining, using a processor of the media source, a play-out time offset based, in part, on the statistical variation;
sending out the play-out time offset once for all time-stamped media data packets of the session;
receiving the time-stamped media data packet and the play-out time offset, the play-out time offset being received once for all time-stamped media data packets of the session;
determining the global wallclock time at the one or more receiving media sinks;
determining a common play-out time of the time-stamped media data packet by adding the play-out time offset and the time of the creation of the time-stamped media data packet; and
playing the time-stamped media data packet when the determined common play-out time of the time-stamped media data packet is reached.

* * * * *